United States Patent [19]

Landmeier

[11] Patent Number: 5,247,138
[45] Date of Patent: Sep. 21, 1993

[54] CORDLESS DIGITIZER STYLUS STATUS ENCODING AND TRANSMISSION SCHEME

[75] Inventor: Waldo L. Landmeier, Phoenix, Ariz.

[73] Assignee: CalComp Inc., Anaheim, Calif.

[21] Appl. No.: 789,665

[22] Filed: Nov. 8, 1991

[51] Int. Cl.⁵ .............................................. G08C 21/00
[52] U.S. Cl. ..................................................... 178/19
[58] Field of Search ............................. 178/18, 19, 87

[56] References Cited

U.S. PATENT DOCUMENTS 5,138,118 8/1992 Russell .................................. 178/19

Primary Examiner—Stafford Schreyer
Attorney, Agent, or Firm—Donald A. Streck; Wm. F. Porter, Jr.

[57] ABSTRACT

In a cordless digitizing system wherein a cordless stylus having a manually operable button thereon transmits positional pulses to a tablet at a carrier frequency this invention is apparatus for transmitting status information about the button to the tablet. There is first status logic associated with the stylus for sensing the present status of the button and for encoding and transmitting the present status of the button as a binary 1 or 0 employing a first unique and recognizable sequence of carrier frequency cycles as a binary "1" and a second unique and recognizable sequence of carrier frequency cycles as a binary "0". Then, there is second status logic included in association with the tablet for recognizing the first unique and recognizable sequence of carrier frequency cycles to be a binary "1", for recognizing the second unique and recognizable sequence of carrier frequency cycles to be a binary "0", and for determining the present status of the button therefrom. The status of multiple buttons on the stylus is transmitted in the same manner by assigning the buttons positions in a binary data stream.

16 Claims, 2 Drawing Sheets

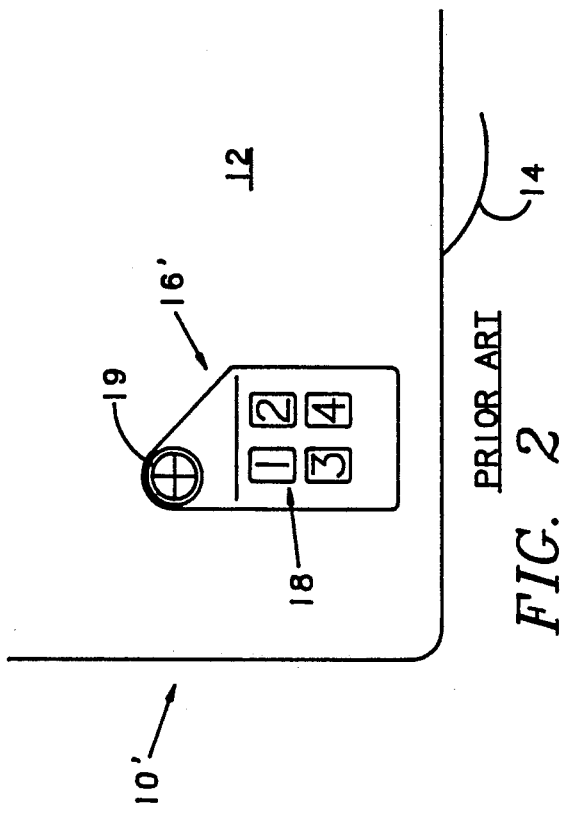
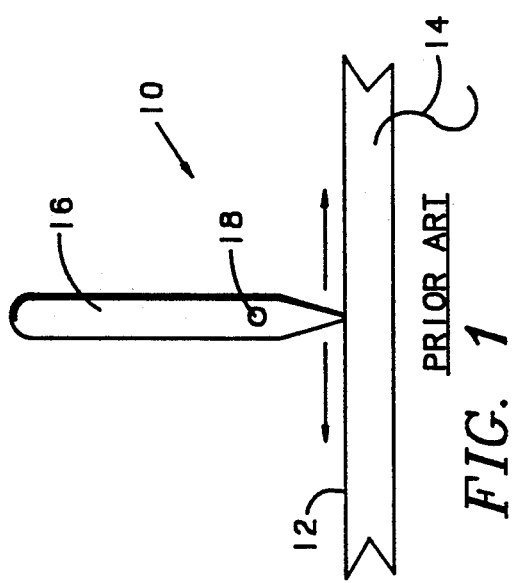
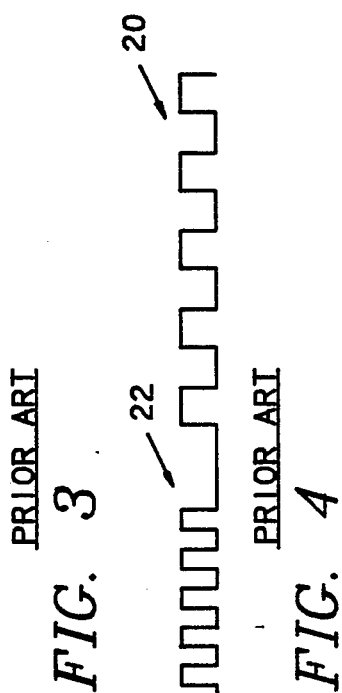
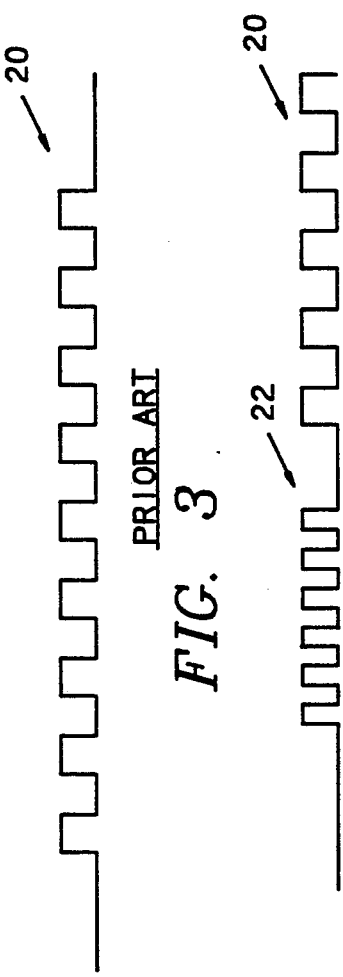

CORDLESS DIGITIZER STYLUS STATUS ENCODING AND TRANSMISSION SCHEME

BACKGROUND OF THE INVENTION

This invention relates to digitizer tables, and, more particularly, in a cordless digitizing system wherein a cordless stylus having a manually operable button thereon transmits positional pulses to a tablet at a carrier frequency, to apparatus for transmitting status information about the button to the tablet comprising, first status logic associated with the stylus for sensing the present status of the button and for encoding and transmitting the present status of the button as a binary 1 or 0 employing a first unique and recognizable sequence of carrier frequency cycles as a binary "1" and a second unique and recognizable sequence of carrier frequency cycles as a binary "0"; and, second status logic included in association with the tablet for recognizing the first unique and recognizable sequence of carrier frequency cycles to be a binary "1", for recognizing the second unique and recognizable sequence of carrier frequency cycles to be a binary "0", and for determining the present status of the button therefrom.

In a digitizing tablet system, a stylus is moved over the surface of a tablet to input positional information related to an X,Y coordinate system associated with the tablet to a computer connected to the tablet. To allow the user to indicate when positional information is to be taken, and the like, the stylus typically has one or more manually-operable buttons associated with it. Recently, for use with so-called pen-driven computing systems where a digitizing tablet associated with a display is the primary input device for the computer, cordless digitizers having no physical connection between the stylus and the tablet have become the configuration of choice because of their added convenience to the user.

The elements of typical cordless digitizer systems are shown in simplified form in FIGS. 1 and 2. The system of FIG. 1 is directed to the use of a pen-type stylus while the system of FIG. 2 employs a puck-type stylus. The system 10 of FIG. 1 comprises a tablet 12 having a connecting cable 14 (or optical link) to the computer (not shown). There is a pen-type stylus 16 having an above-mentioned button 18 thereon. The system 10' of FIG. 2 again comprises a tablet 12 having a connecting cable 14 (or optical link) to the computer (not shown). In this case, there is a puck-type stylus 16' having a plurality of the above-mentioned buttons 18 thereon. In implementations according to techniques employed by the assignee of this application, the stylus 16, 16' is powered by a small lithium battery of the type employed in hearing aids and the like. Accordingly, it can be appreciated that low power consumption as well as reliability are both important aspects of the manner of operation. The stylus 16, 16' contains a coil (such as that indicated as 19 in FIG. 2) which is driven by a pulse stream 20 as depicted in FIG. 3 for positional sensing purposes. The coil emits a corresponding stream of AC magnetic pulses which are sensed by scanned sensing grids in the tablet. The signals developed in the sensing grids are then employed to determined the position of the stylus 16, 16' on the surface of the tablet 12 according to techniques which are well known to those skilled in the art and which form no part of the present invention.

In one previously employed approach to transmitting the status of the button(s) 18, a pulse stream as depicted in FIG. 4 is employed. The positional sensing pulses 20 are followed by button pulses 22 as twice the frequency of the pulses 20 so as to be distinguishable therefrom. The information on the status of the button(s) 18 is encoded within the pulses 22. Unfortunately, this technique proved to be unreliable in a high noise environment. It also consumed 10% of the available power just for the button encoding process.

Cordless digitizers sold under the Wacom and Kurta tradenames use a variable frequency technique for button encoding. In these approaches, the carrier frequency is changed as a function of button depression. As can be appreciated, if a puck type of stylus is employed with multiple buttons, the circuitry to detect the corresponding multiple changes in the carrier frequency attributable to button pushing without effecting position determination accuracy can become complex. Even with only one button, noise can be a significant factor in such an approach as well.

Separate transmission apparatus for transmitting the button status merely adds to the cost of manufacture, size, power consumption, and complexity of the stylus and is, therefore, not really a viable alternative for solving these problems.

Wherefore, it is the object of the present invention to provide a method for encoding and transmitting button status information from the stylus of a cordless digitizer system which is highly accurate and reliable even in an extreme noise environment.

It is also the object of the present invention to provide a method for encoding and transmitting button status information from the stylus of a cordless digitizer system which does not consume any extra power.

Other objects and benefits of the invention will become apparent from the detailed description which follows hereinafter when taken in conjunction with the drawing figures which accompany it.

SUMMARY

The foregoing objects have been attained in a cordless digitizing system wherein a cordless stylus transmits positional pulses to a tablet at a carrier frequency by apparatus implementing a method for transmitting status information about the stylus to the table comprising the steps of:

assigning a first unique and recognizable sequence of carrier frequency cycles to be a binary "1";

assigning a second unique and recognizable sequence of carrier frequency cycles to be a binary "0"; and, transmitting the status information in binary form employing the first unique and recognizable sequence of carrier frequency cycles as binary 1s and the second unique and recognizable sequence of carrier frequency cycles as binary 0s.

Preferably, the method includes the step of preceding transmission of the status information in binary form with a binary preamble identifying the start of a status information transmission.

If more than one type of status information is being transmitted, the preferred method also includes the step of preceding transmission of the status information in binary form with a binary preamble identifying the type of status information to follow.

In implementations where the stylus has plurality of manually-operable buttons, the step of transmitting the status information in binary form comprises transmitting a plurality of binary bits associated with the status of respective ones of the buttons.

According to one implementation, the step of assigning a first unique and recognizable sequence of carrier frequency cycles to be a binary "1" comprises assigning m cycles of no carrier signal followed by a cycles of carrier signal as a binary "1"; and, the step of assigning a second unique and recognizable sequence of carrier frequency cycles to be a binary "0" comprises assigning p cycles of no carrier signal followed by q cycles of carrier signal as a binary "0"; where, m and p are different, n and q are different, and m, p, n, and q can be zero.

According to one another implementation, the step of assigning a first unique and recognizable sequence of carrier frequency cycles to be a binary "1" comprises assigning m cycles of carrier signal followed by n cycles of no carrier signal as a binary "1"; and, the step of assigning a second unique and recognizable sequence of carrier frequency cycles to be a binary "0" comprises assigning p cycles of carrier signal followed by q cycles of no carrier signal as a binary "0"; where, m and p are different, n and q are different, and m, p, n, and q can be zero.

DESCRIPTION OF THE DRAWINGS

FIG. 1 is a simplified drawing of a prior art cordless digitizer system as wherein the present invention is employed of the type having a pen-type stylus.

FIG. 2 is a simplified drawing of a prior art cordless digitizer system as wherein the present invention is employed of the type having a puck-type stylus.

FIG. 3 is a simplified drawing of a pulse stream as typically used to drive a cordless stylus such as those of FIGS. 1 and 2 for positional sensing purposes.

FIG. 4 is a simplified drawing of a pulse stream as typically used to drive a cordless stylus such as those of FIGS. 1 and 2 for positional and button sensing purposes.

DESCRIPTION OF THE PREFERRED EMBODIMENT

The foregoing objects have been achieved in the present invention by employing the basic positional pulse frequency of the stylus to encode and transmit the button status information. This, of course, immediately meets one of the primary objectives, i.e., it does not impose any additional power consumption requirements.

Figure 6:
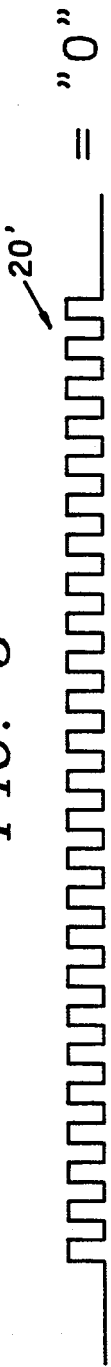
FIG. 6 is a simplified drawing of a pulse stream as employed in the present invention to indicate a binary "0" when encoding button information according to the present invention.
Figure 7:
FIG. 7 is a simplified drawing of a pulse stream as employed in the present invention to indicate a binary "1" when encoding button information according to the present invention.

The button status information is encoded as a binary data stream comprised of "1"s and "0"s as depicted in FIGS. 6 and 7. In a tested embodiment, each binary digit is contained within twenty-five cycles of the carrier signal employed to generate the pulses 20 of FIG. 2. As those skilled in the art will readily recognize and appreciate, twenty-five cycles is not a critical limitation. The number of cycles chosen should be sufficient to represent a significant time sample in a high noise environment without being wasteful in power consumption. In the tested embodiment, twenty-five cycles provided reliable information on button status despite noise. The number of cycles chosen should also be distinguishable from the positional pulses 20 of FIG. 3 since they are at the same frequency. As depicted in FIG. 6, in the tested embodiment twenty-five cycles of the carrier signal 20' was defined as a binary "0" while ten cycles of no carrier followed by fifteen cycles of the carrier signal 20' was defined as a binary "1" as depicted in FIG. 7. The pattern could also be carrier followed by no carrier, if desired, or any unique and recognizable sequence of carrier frequency cycles and non-cycles to be a binary "1" and a binary "0", respectively.

Figure 8:
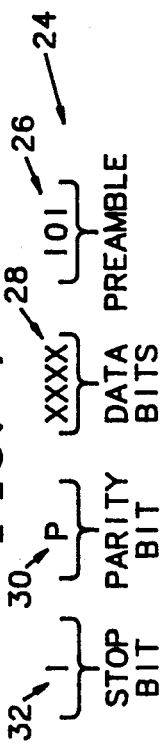
FIG. 8 is a drawing of a representative encoded information stream that can be employed to transmit button information from the stylus to the tablet according to the present invention.

In the preferred button status informational transmission as depicted in one possible tested form in FIG. 8, the stream 24 starts with a recognizable preamble 26 such as "101". As those skilled in the art will readily recognize and appreciate, the method of this invention can also be employed to transmit other information from the stylus 16 to the tablet 12 if such is available. For example, for handwriting analysis using a pen-shaped stylus 16 as in FIG. 1, data about the pressure on the stylus 16 against the tablet 12 may be developed and need transmitting to the tablet 12 for further transmission to the computer for use in the analysis process. By associating different preambles 26 with the different data, the data can be distinguished easily. Following the preamble 26 are the data bits 28 representing the status of (in this case) the four buttons 18 of the stylus 16' of FIG. 2. Each binary digit of the four data bits 28 represents the status of one button 18, i.e. depressed "1" or non-depressed "0". Four binary data bits could also be employed to represent sixteen degrees of pressure on the stylus 16 (from none, 0000, to maximum, 1111). Preferably, for error detection purposes, the data bits 28 are followed by a parity bit 30 and a stop bit 32 representing the end of that particular transmission. The use of parity bits is well known to those skilled in the digital computer arts and, therefore, will not be addressed any further herein. The field sizes as described above are, of course, arbitrary in nature and can be designed and configured to best suit the needs of an implementor.

Figure 5:
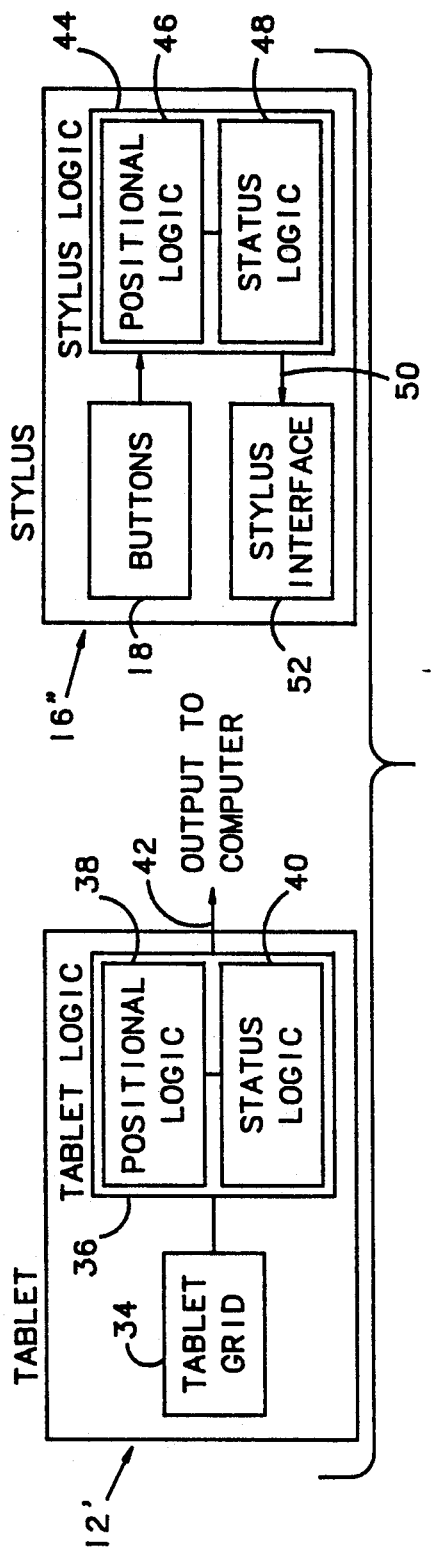
FIG. 5 is a functional block diagram of a cordless digitizer system according to the present invention for implementing the status transmitting and recognition aspects thereof.

The elements of a digitizer tablet system for implementing the above-described wireless status transmission and reception approach of this invention are depicted in FIG. 5. The tablet 12' includes the tablet grid 34 which in the preferred approach senses the signals transmitted by the stylus 16". The tablet 12' also includes tablet logic 36 which includes the usual positional logic 38 as well as status logic 40 for implementing the receiving and signal deciphering portions of the present invention as described above. Thus, the signals from the tablet grid 34 are input to both the positional logic 38 and the status logic 40. Both the positional logic 38 and the status logic 40 are connected to output to the computer (not shown) connected thereto on the line 42. The stylus 16" has stylus logic 44 which includes the usual position logic 46 and status logic 48. Both the position logic 46 and the status logic 48 are connected to control the path of the carrier frequency at 50 to the stylus interface 52 (which in the preferred embodiment is the driven signal-emitting coil). The status of the buttons 18 is input to the stylus logic 44 and, in particular, to the status logic 48 which senses the status of the buttons 18 and uses the present status to control the status signal output to the stylus interface 52 as described above. The buttons 18 could, of course, also comprise a stylus pressure transducer so as to transmit the pressure on the stylus as mentioned earlier herein.

Wherefore, having thus described the present invention, what is claimed is:

I claim:

1. In a cordless digitizing system wherein a cordless stylus transmits positional pulses to a tablet at a carrier frequency, a method for transmitting status information about the stylus to the tablet comprising the steps of:
   a) assigning a first unique and recognizable sequence of carrier frequency cycles to be a first binary state wherein said first sequence comprises a number of cycles of carrier signal, a contiguous portion of a predetermined length of said first sequence being suppressed;
   b) assigning a second unique and recognizable sequence of second binary state wherein said second sequence comprises said number of cycles of carrier signal, said second sequence being generally unsuppressed; and,
   c) transmitting the status information in binary form employing said first unique and recognizable sequence of carrier frequency cycles as said first binary state and said second unique and recognizable sequence of carrier frequency cycles as said second binary state, and wherein said first and second sequences are transmitted in continuous succession whereby successive sequences of said second binary state comprise contiguous unsuppressed cycles of carrier signal.

2. The method of claim 1 and additionally comprising the step of:
   preceding transmission of the status information in binary form with a binary preamble identifying the start of a status information transmission.

3. The method of claim 1 wherein more than one type of status information is transmitted from the stylus to the tablet and additionally comprising the step of:
   preceding transmission of the status information in binary form with a binary preamble identifying the type of status information to follow.

4. The method of claim 1 wherein:
   a) the stylus has a plurality of manually-operable buttons; and,
   b) said step of transmitting the status information in binary form comprises transmitting a plurality of binary bits associated with the status of respective ones of the buttons.

5. In a cordless digitizing system wherein a cordless stylus having a manually operable button thereon transmits positional pulses to a tablet at a carrier frequency, a method for transmitting status information about the button to the tablet comprising the steps of:
   a) assigning a first unique and recognizable sequence of carrier frequency cycles to be a first binary state wherein said first sequence comprises a number of cycles of carrier signal, a contiguous portion of a predetermined length of said first sequence being suppressed;
   b) assigning a second unique and recognizable sequence of carrier frequency cycles to be a second binary state wherein said second sequence comprises said number of cycles of carrier signal, said second sequence being generally unsuppressed; and,
   c) transmitting the status information about the button in binary form employing said first unique and recognizable sequence of carrier frequency cycles as said first binary state and said second unique and recognizable sequence of carrier frequency cycles as said second binary state, and wherein said first and second sequences are transmitted in continuous succession whereby successive sequences of said second binary state comprise contiguous unsuppressed cycles of carrier signal.

6. The method of claim 5 wherein the stylus has a plurality of buttons thereon and said step (c) of transmitting the status information comprises the steps of:
   a) assigning respective ones of the buttons a position in a binary data stream; and,
   b) transmitting said data stream employing said first unique and recognizable sequence of carrier frequency cycles as a first binary state and said second unique and recognizable sequence of carrier frequency cycles as a second binary state with the first binary state and the second binary state reflecting the present status of respective ones of the buttons at each assigned position in the binary data stream.

7. The method of claim 5 and additionally comprising the step of:
   preceding transmission of button status information in binary form with a binary preamble identifying the start of a status information transmission.

8. In a cordless digitizing system wherein a cordless stylus having a manually operable button thereon transmits positional pulses to a tablet at a carrier frequency, apparatus for transmitting status information about the button to the tablet comprising:
   a) a first status logic associated with the stylus for sensing the present status of the button and for encoding and transmitting said present status of the button as one of (i) a first binary state and (ii) a second binary state employing a first unique and recognizable sequence of carrier frequency cycles to be the first binary state wherein said first sequence comprises a number of cycles of carrier signal, a contiguous portion of a predetermined length of said first sequence being suppressed, and a second unique and recognizable sequence of carrier frequency cycles as the second binary state wherein said second sequence comprises said number of cycles of carrier signal, said second sequence being generally unsuppressed, and wherein said first and second sequences are transmitted in continuous succession whereby successive sequences of said second binary state comprise continuous unsuppressed cycles of carrier signal; and,
   c) second status logic included in association with the tablet for recognizing said first unique and recognizable sequence of carrier frequency cycles to be the first binary state, for recognizing said second unique and recognizable sequence of carrier frequency cycles to be the second binary state, and for determining said present status of the button therefrom.

9. The apparatus of claim 8 wherein the stylus has a plurality of buttons thereon and additionally comprising:
   a) said first status logic having respective ones of said plurality of buttons assigned to a position in a binary data stream;
   b) said first status logic including logic for sensing the present status of each of said plurality of buttons and for encoding and transmitting said present status of each of said plurality of buttons as one of (i) the first binary state and (ii) the second binary state in its said position in said binary data stream; and, c) said second status logic including logic for determining said present status of each of said plurality of buttons from one of (i) the first binary state and (ii) the second binary state in its said position in said binary data stream.

10. The apparatus of claim 9 and additionally comprising:

said first status logic including logic for preceding transmission of button status information in binary form in said binary data stream with a binary preamble identifying a start of a status information transmission.

11. In a cordless digitizing system wherein a cordless stylus having a plurality of manually operable buttons thereon transmits positional pulses to a tablet at a carrier frequency, apparatus for transmitting status information about the buttons to the tablet comprising:

a) first status logic associated with the stylus having respective ones of the plurality of buttons assigned to a position in a binary data stream for sensing the present status of each of the plurality of buttons and for encoding and transmitting said present status of each of the plurality of buttons as a binary 1 or 0 at its said position in said binary data stream employing a first unique and recognizable sequence of carrier frequency cycles as a binary "1" and a second unique and recognizable sequence of carrier frequency cycles as a binary "0"; and, b) second status logic included in association with the tablet for recognizing said first unique and recognizable sequence of carrier frequency cycles to be a binary "1", for recognizing said second unique and recognizable sequence of carrier frequency cycles to be a binary "0", and for determining said present status of each of the plurality of buttons from a binary 1 or 0 in its said position in said binary stream.

12. The apparatus of claim 11 and additionally comprising:

said first status logic including logic for preceding transmission of button status information in binary form in said binary data stream with a binary preamble identifying a start of a status information transmission.

13. The method of claim 1 wherein:

said step of assigning a first unique and recognizable sequence of carrier frequency cycles to be said first binary state wherein the contiguous suppressed portion is at the beginning of said first sequence.

14. The method of claim 1 wherein:

said step of assigning a first unique and recognizable sequence of carrier frequency cycles to be said first binary state wherein the contiguous suppressed portion is at the end of said first sequence.

15. The method of claim 5 wherein:

said step of assigning a first unique and recognizable sequence of carrier frequency cycles to be said first binary state wherein the contiguous suppressed portion is at the beginning of said first sequence.

16. The method of claim 5, wherein:

said step of assigning a first unique and recognizable sequence of carrier frequency cycles to be said first binary state wherein the contiguous suppressed portion is at the end of said first sequence.

* * * * *